July 23, 1946.  J. E. LEWIS  2,404,642
ROLLER BEARING RETAINER
Filed Oct. 10, 1944
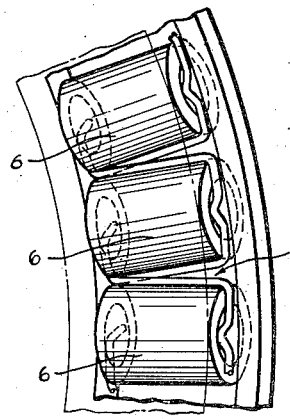
Fig. 1
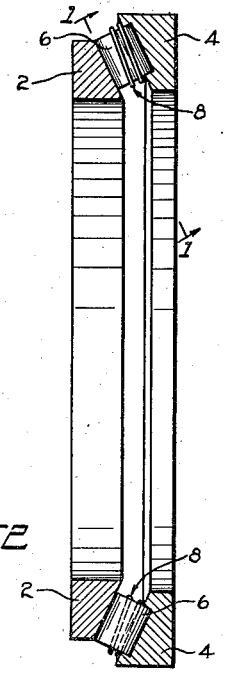
Fig. 2
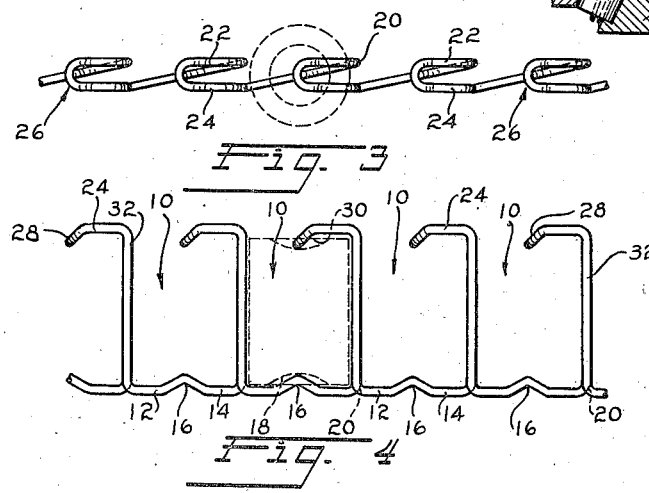
Fig. 3
Fig. 4
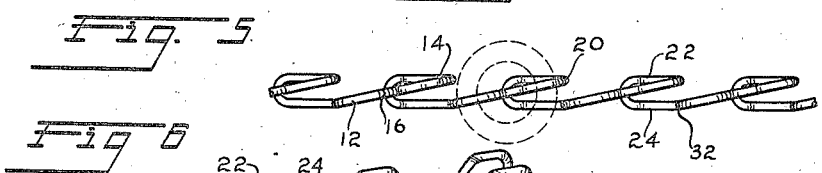
Fig. 5
Fig. 6
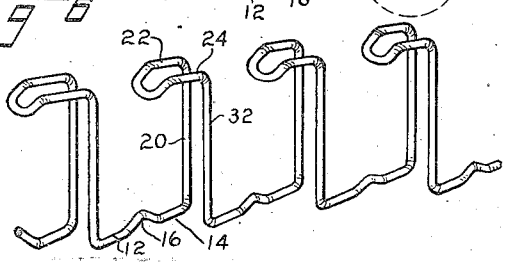
Inventor
JAMES E. LEWIS
Scrivener & Parker
Attorneys Patented July 23, 1946

2,404,642

UNITED STATES PATENT OFFICE 2,404,642

ROLLER BEARING RETAINER

James E. Lewis, Corry, Pa., assignor to Associated Spring Corporation, Bristol, Conn., a corporation of Delaware Application October 10, 1944, Serial No. 558,031

3 Claims. (Cl. 308—235)

This invention relates to cages or retainers for roller bearings and the principal object thereof is to provide such a cage or retainer which is formed of a single piece of wire and provides a unitary cage for a number of roller bearings.

It is a further object of the invention to provide a retaining cage for roller bearings which will separately and rotatably support each roller but will permit the entire bearing assembly to be handled as a unit.

A further object is to provide a retaining cage supporting a set of rollers as a unitary group and permitting such rollers to be assembled to the inner or outer race rings.

Other objects and features of novelty of the invention will be made apparent by the following description and the annexed drawing which, it will be understood, are only illustrative of the invention and impose no limitations thereon not imposed by the appended claims.

Referring to the drawing, in which similar reference numerals refer to like parts, Fig. 1 is an elevation of part of a roller bearing equipped with a cage according to my invention and taken on line 1—1 of Fig. 2;

Fig. 2 is a sectional view of a roller bearing assembly, and

Figs. 3, 4, 5 and 6 are, respectively, top, side, bottom and perspective views of a cage according to the invention.

In Figs. 1 and 2 of the drawing there is disclosed a roller bearing comprising the inner race 2, the outer race 4 and a plurality of roller bearings 6 arranged between the inner and outer races. A wire retaining cage 8, which is constructed and positioned in accordance with my invention, supports each roller for rotation about its own axis and releasably connects all of them together, thus forming a unitary roller assembly.

The cage 8 is formed of a single piece of wire bent to provide a plurality of roller retaining parts which are each designated by the numeral 10. Each roller retaining part comprises a bottom which is adapted, when assembled to a roller, to lie just beneath the roller and parallel to the adjacent end face thereof, and which comprises aligned end pieces 12, 14 connected by a struck-up part 16 which is adapted to engage within the depression 18 which is formed in each end of the roller bearing. The outer end of the end part 14 is turned at right angles and continued to provide a part 20 which extends parallel to the axis of the roller and is of approximately the same length. At its upper end the part 20 is turned at right angles at 22 in the same direction as the part 14 and is then doubled back on itself at 24 to provide a U-shaped upper retaining member 26 which is adjacent and parallel to the upper face of a roller when the parts are assembled. The upper retaining member 26 terminates in a downwardly inclined end part 28 which is adapted to be received within a recess 30 in the upper end of the roller bearing. The length of the parts 12, 14 and 26 is approximately the same as the radius of the roller whereby the struck-up portion 16 and the end part 28 are substantially aligned with each other in order that each will engage the lowest points in the depressions in the respective ends of the rollers.

The end of the part 24 is turned at right angles to provide a part 32 which is parallel to and substantially co-extensive with the part 20. At its lower end the part 32 is integrally connected to the end part 12 of the bottom of the next retaining part 10.

Each roller may be inserted within a retaining part of the cage by first moving the upright arms 20, 32 thereof out of right-angular relation with the bottom of the retaining part and then slipping the roller into place with the struck-up part 16 within the depression in the bottom thereof. The arms 20, 32 are then released to allow the end part 28 to move into the depression at the upper end of the roller.

When a complete set of rollers is assembled in a cage according to the invention, the cage and rollers may be moved or transported in any way without disturbing the rollers. Also, when so assembled this unitary structure may be assembled to the inner or outer race of a bearing.

While I have described and illustrated one form which my invention may take it will be apparent to those skilled in the art that other embodiments may be made, as well as modifications of that disclosed herein, all without departing in any way from the spirit and scope of the invention, for the limits of which reference must be had to the appended claims.

I claim:

1. A roller bearing cage comprising a single wire formed to provide a plurality of roller retaining parts, each of said parts comprising two strands of the wire adapted to extend parallel to the axis of the roller and adjacent the side wall thereof when the parts are assembled, a roller retaining member turned at approximately right angles from one end of one of said strands, and a U-shaped roller retaining member disposed at approximately right angles to said strands at the other end thereof and the arms of which are respectively connected to said strands.

2. A roller bearing cage comprising a single wire formed to provide a plurality of roller retaining parts, each of said parts comprising two strands of the wire adapted to extend parallel to the axis of the roller and adjacent the side wall thereof when the parts are assembled, a roller retaining member turned at approximately right angles from one end of one of said strands and having a struck-up portion adapted to be received within a depression in the center of one end of a roller, and a U-shaped roller retaining member disposed at approximately right angles to said strands at the other end thereof and the arms of which are respectively connected to said strands and having a downwardly-turned end adapted to be received within a depression in the center of the other end of the roller.

3. A roller bearing cage comprising a single wire formed to provide a plurality of roller retaining parts, each of said parts comprising a part adapted to extend parallel to the axis of the roller and adjacent the side wall thereof and other parts respectively adapted to extend parallel to and adjacent the opposite ends of the roller when the roller and cage are assembled and each having an inwardly turned part adapted to be received within a depression in the center of one end of a roller.

JAMES E. LEWIS.